Feb. 21, 1933.  W. D. KILBOURN  1,898,189
POISON AND METHOD OF PRODUCING SAME
Filed May 25, 1928
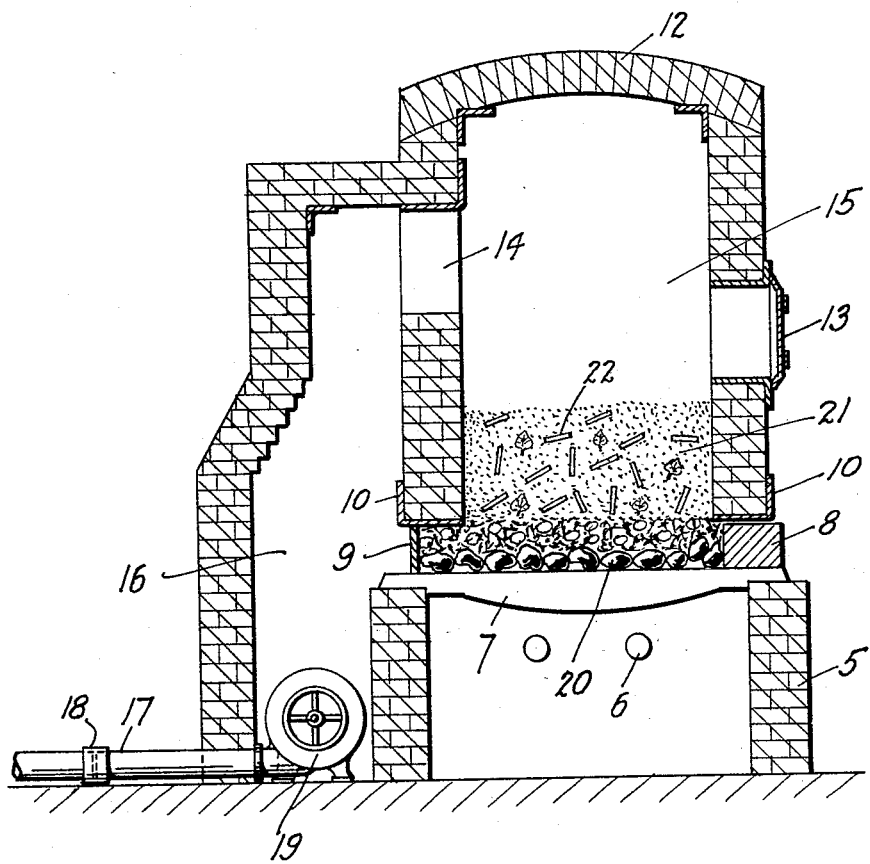
INVENTOR.
William D. Kilbourn
BY
ATTORNEY.

Patented Feb. 21, 1933 1,898,189

UNITED STATES PATENT OFFICE

WILLIAM D. KILBOURN, OF DENVER, COLORADO, ASSIGNOR TO THE WHITE IRON ORES AND PRODUCTS COMPANY

POISON AND METHOD OF PRODUCING SAME

Application filed May 25, 1928. Serial No. 280,488.

My invention relates to poisons and a method of producing same from ores containing arsenic, sulphur and iron in their various mineral combinations, arsenic and sulphur in their various mineral combinations, iron and arsenic in mineral combination together with the mineral pyrites of iron.

Ores containing minerals of arsenic and sulphur are adapted to the process as well as ores containing minerals having an arsenic content together with minerals having a sulphur content, and arsenic products such as white arsenic or crude arsenic may be used with such ores or mixtures of ores.

As an example, an ore containing the mineral known as arsenophrite is particularly well adapted to the process of treatment. An ore containing orpiment or realgar or both is well suited to the process. An ore containing pyrites of iron and smaltite is also capable of being treated by the process.

The presence of other minerals in such ores, such as minerals containing lead, bismuth or antimony does not interfere with the production of the insecticide, it being desirable, however, that the minerals containing iron, sulphur and arsenic predominate in the ore.

An object of the invention is to produce an impalpable powder which will have all the properties of a desirable insecticide which are as follows: suspension in water for a long period with little if any agitation; uniform chemical composition; high toxicity; a fine state of division as to be practically impalpable; substantial insolubility of the arsenic content of the powder in water at ordinary temperatures.

A further object is to produce this compound direct from the ore or ores in one metallurgical operation.

In the previous state of the art of insecticide manufacture where the insecticides contain arsenic it has been the practice to first produce arsenious oxide from arsenic minerals and use this arsenious oxide in succeeding chemical processes to produce chemical combinations of the arsenic with calcium, lead, or copper and acetic acid to produce salts substantially insoluble in water and having toxic properties. These methods are somewhat costly and complex.

It is a further object of my invention to produce a compound having all the desirable qualities of an insecticide and to produce the same in a simple way at a low cost.

The accompanying drawing represents a sectional elevation of a furnace that may be effectively used to carry out the present process. The apparatus is described to clarify the method of carrying out the process, but the details of construction thereof form no part of the present invention, although the furnace is presumably novel and as such, may be made the subject of a separate application for patent.

The reference numeral 5 designates the circular wall of the ash chamber of the furnace. The ash chamber contains the gas burners 6 used to ignite the charge placed in the furnace. Grate bars 7 are supported on the wall 5. A few spaced fire brick 8 on the grate bars provide supports for a ring 10 that is angular in section. The ring supports a circular wall that forms a combustion chamber 15 of the furnace. The spaces between the bricks 8 offer draft openings for the furnace. Doors 9 are provided between the brick pillar supports to regulate the draft.

The combustion chamber is closed at its top by an arch 12 of fire brick. A charging door 13 is provided in a wall of the furnace and opposite thereto is an opening 14 to connect the combustion chamber 15 with a dust chamber 16.

The dust chamber has an outlet at its lower end connected with a sectional condensing flue 17. The sections of the flue may be connected by cloth 18 wound around the joints. A suction blower 19, driven by any suitable means, is disposed to draw the furnace gases from the dust chamber and furnace and force them into the flue thus creating a draft for the furnace and a pressure of gases in the flue.

In carrying out the process by means of a furnace of the above described character, a bed of coke 20, constituting about two percent (2%) of the weight of the total charge, is placed on the grate bars. A charge 21 of ore containing arsenic minerals (with or without arsenic products) is then placed on the coke.

The ore is crushed to approximately an inch in size. This permits rather free circulation of mixed gases and air through the charge, and this may be further facilitated by the removal of the fines from the ore before charging.

Ordinarily in ore roasting methods, ore is crushed very fine, heated to a rather high temperature and rabbled or stirred to bring all the particles of the mineral in contact with air to facilitate the roasting operation. This constant stirring causes dust to rise from the charge and enter the flues, but in my process the furnace charge is not stirred or disturbed and this is an important feature of the process as dust is prevented from forming and entering the flue to contaminate the flue products.

It is an essential feature of my invention that the insecticide produced by the process, is insoluble in water and this object is attained in a simple manner by mixing with the charge in the furnace, organic matter which upon being heated, releases vapors that uniting with arsenic sublimate, render the arsenic substantially insoluble in water. The organic material may be intermixed with the charge in any suitable manner but it is preferred to place it between successive layers of the ore. The roots and foliage of the common western sage brush are particularly adapted for the purpose. After the furnace has been charged in the above described manner, the charging door is closed, the exhaust fan started, and the gas burners lighted under the grates. When the coke has ignited the gas may be turned off. Since it is found desirable to obtain a bed of ore about twenty inches deep, the ore may now be charged in to that depth, or about six (6) inches may be fed at a time. If the charge is made at intervals it is customary to wait until the top of the charge shows red through combustion before the succeeding layer of charge is introduced. This method of charging and firing very gradually heats the ore to a low red heat and slowly releases the arsenic as vapor which condenses in the flues to non-crystalline fume in the nature of an impalpable powder.

An important part of the present process is the formation of reducing gases to prevent complete oxidation of the components of the charge.

Reducing gases may be introduced below the grate, when coke is not used, but where coke is used it generates the reducing gases and after the ignition of the ore charge, the sulphur forms its own reducing gases.

It is to be understood that any suitable form of furnace may be used and the charge of ore ignited by any suitable means.

The slow sublimation with partial oxidation of the sublimed products is facilitated by the method of charging which causes the heat to gradually ascend from the bottom to the top of the charge. The oxidation of the sublimed products supplies heat largely furnished by the oxidation of the sulphur of the ore which takes place slowly from the surface of the lumps of ore inward. About six hours is required to treat a furnace charge by this method of heat treatment, the charge consisting approximately of 1500 pounds of ore and 30 pounds of coke. The operation is carried on at such a low temperature that one's hand may be held in the furnace over the furnace charge and wooden flues may be used for condensation.

The sublimate or fume collects as a fine powder on the walls of the flue, from where it is removed when the burning of the charge is completed. This powder has all the requisites for a superior insecticide, is exceedingly toxic, forms with water a semi-colloidal mixture, remaining in suspension without agitation in a very remarkable way, and its arsenic content is substantially insoluble in water.

That the product is a chemical combination of arsenic and sulphur and not a mechanical mixture of arsenious acid with sulphur has been shown in the treatment of the product with carbon disulphide. Carbon disulphide is a well known solvent for sulphur when the sulphur does not occur in chemical combination, but it fails to dissolve sulphur from my product.

The addition of sage roots or other organic matter is, as has been stated hereinbefore, quite an important feature of the process as otherwise the resulting sublimate would carry water-soluble arsenic to a degree which would render it dangerous to tender plant foliage through burning of the foliage. Other organic and other woody materials may be used instead of sage roots, to wit, sage foliage, oak bark and roots, etc.

The presence of the distillate from the sage roots and foliage in the sublimate renders the arsenic content of the fume or sublimate substantially insoluble in warm or cold water.

The distillate is obtained from the organic matter simultaneously with the formation of the sublimates in the furnace and in a way which approximates what is called dry distillation. The organic materials with the exception of carbon are volatilized from the sage and condensed with the sublimate in the flue. The absence of oxygen about the sage roots in the charge, due to reducing gases present, and the gradually rising heat, cause the oils and liquids to volatilize, and the sage woody fibre to be reduced to charcoal before burning.

To adapt the insecticide for commercial use, it is preferred to mix the fume removed from the flue, with water to form a stiff paste for the powder is so light that it will not readily mix with water as it does not contain sufficient distillate to render it moist.

This is conveniently done by adding a small amount of water to a relatively large amount of powder and forming a paste to which water is gradually added together with more powder.

The paste readily takes up the powder which ordinarily would float on water and be difficult to submerge.

In the absence of a sufficient quantity of ore to produce the desired quantity of arsenic sublimate, or in case the ore has an insufficient arsenic content, or under other similar conditions, the production of the insecticide may be increased and brought to the desired percentage by mixing the white arsenic of commerce or crude arsenic with the ore.

In this operation the specific gravity of the sublimate which weighs only 31 pounds to the cubic foot is very much lower than the specific gravity of white arsenic which weighs around 125 pounds to the cubic foot and the product compares with that from the treatment of arsenic ores without the addition of arsenic for use as an insecticide in chemical composition and otherwise.

As an example of a practical method of performing the process, the following is the process as it has been practiced with satisfactory results:

Thirty pounds of coke were charged upon the grate of a furnace having an inside diameter of about thirty-six inches.

Upon this coke is spread five hundred pounds of arsenic ore, the ore containing about four percent of elemental arsenic and a higher percentage of sulphur. The minerals present were pyrite, arsenophrite, and smaltite. Before charging the furnace the ore had been crushed to one inch in diameter and the fines removed by screening.

Upon this layer of ore was placed a few pounds of sage roots and foliage, and over the organic matter five hundred pounds of similar crushed and screened ore was spread.

Upon the last layer of ore were spread fifty pounds of white arsenic, which amount did not check the draft in the furnace, and the charge was completed by another layer consisting of five hundred pounds of like ore similarly crushed and screened.

The exhaust fan was now started and the coke upon the grate and upon which the entire charge rests was ignited by means of the gas burner under the grate.

After the coke was ignited the gas was turned off.

The ore ignited slowly from the burning coke, and the slow progressive burning of the charge from the bottom upward in the partially reducing atmosphere caused the release of the arsenic in the ore and charge, as fume in the presence of gases containing sulphur from the burning sulphides. Sulphur dioxide was a rather high constituent of the gases generated.

During the above described operation of the furnace the volatile matter of the sage was driven off before the fire reached it.

In about six hours the top of the furnace charge showed a red heat and the treatment was thereby shown to be completed.

The flue product, which with the addition of air through the medium of the exhaust fan showed a chemical combination of arsenic and sulphur, together with distillate from the sage, or other organic matter, had a sulphur content of about two and one-half percent, which, however, was readily varied between limits of from two to six percent by regulating the draft by changing the speed of the fan.

The dry powder removed from the flue was thoroughly mixed in a suitable mixer with enough water to make up a paste, until a paste of uniform consistency was produced.

What I claim and desire to secure by Letters Patent is:

1. The herein described process comprising the mixing of sage-plants with arsenic-containing material, heating the mixture until volatile matter of the sage-plants is released and the material sublimated, and condensing the gases.

2. The herein described process of producing toxic powder comprising the charging material adapted to produce water-soluble arsenic upon being sublimated with hard wood matter that upon being heated is adapted to release vapors that by contact with arsenic sublimate render the arsenic substantially insoluble in water, heating the charge to release said vapors and to sublimate the material, and condensing the resultant gases.

3. The herein described process comprising the mixing of a woody substance with material adapted to produce water-soluble arsenic upon being sublimated, heating the mixture until volatile matter is released from the woody substance and the material sublimated, and condensing the gases, whereby to render the arsenic substantially insoluble in water.

4. Toxic matter containing arsenic in chemical combination with hard wood distillate.

In testimony whereof I have affixed my signature.

WILLIAM D. KILBOURN.